Jan. 5, 1954

G. C. SANDS 2,665,092

SPRAYING ATTACHMENT FOR AIRPLANES

Filed June 13, 1952

Gordon C. Sands
INVENTOR.

BY *Clarence A. O'Brien*
*and Harvey B. Jacobson*
Attorneys

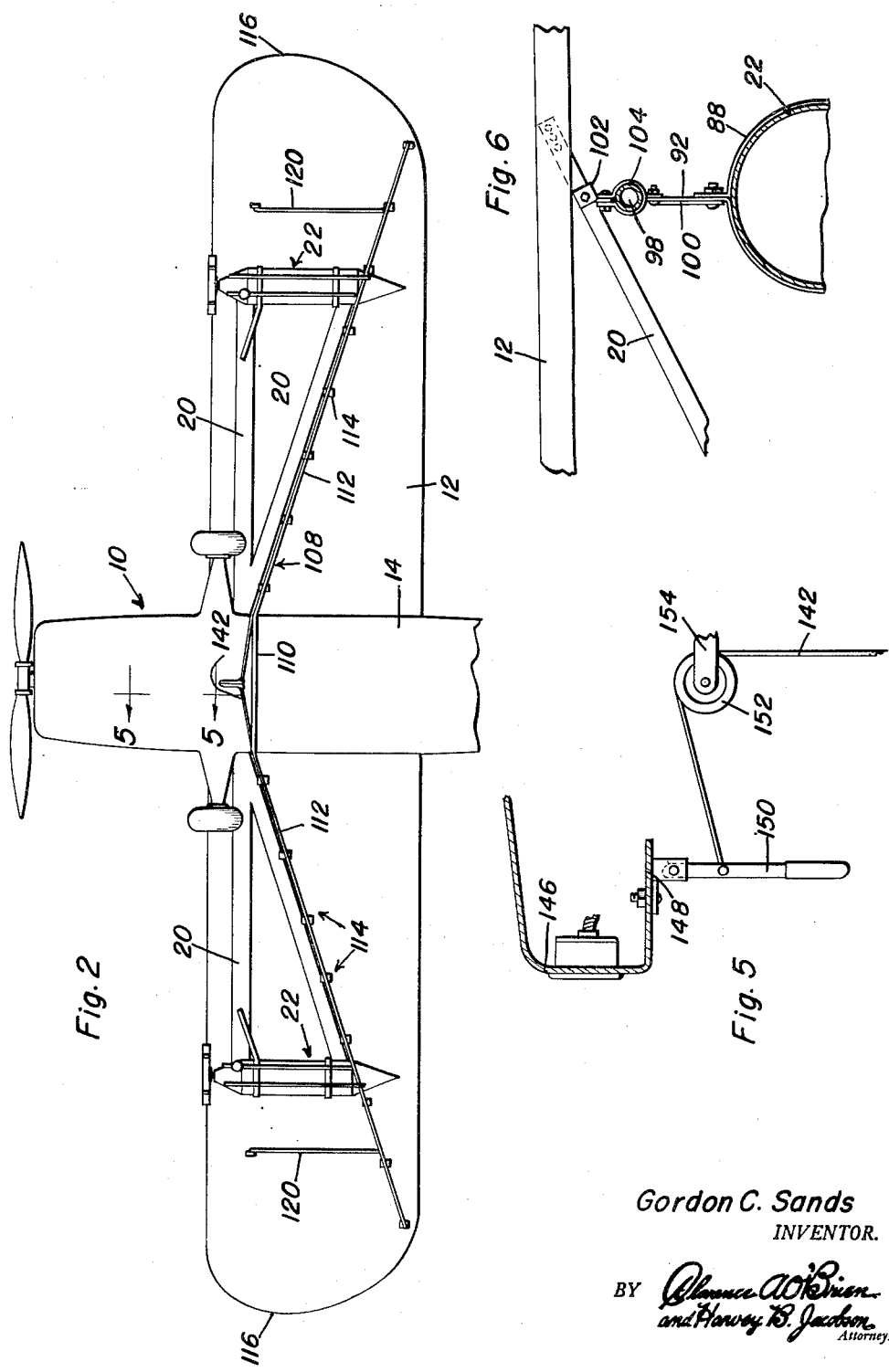

Jan. 5, 1954 G. C. SANDS 2,665,092
SPRAYING ATTACHMENT FOR AIRPLANES
Filed June 13, 1952 3 Sheets-Sheet 3
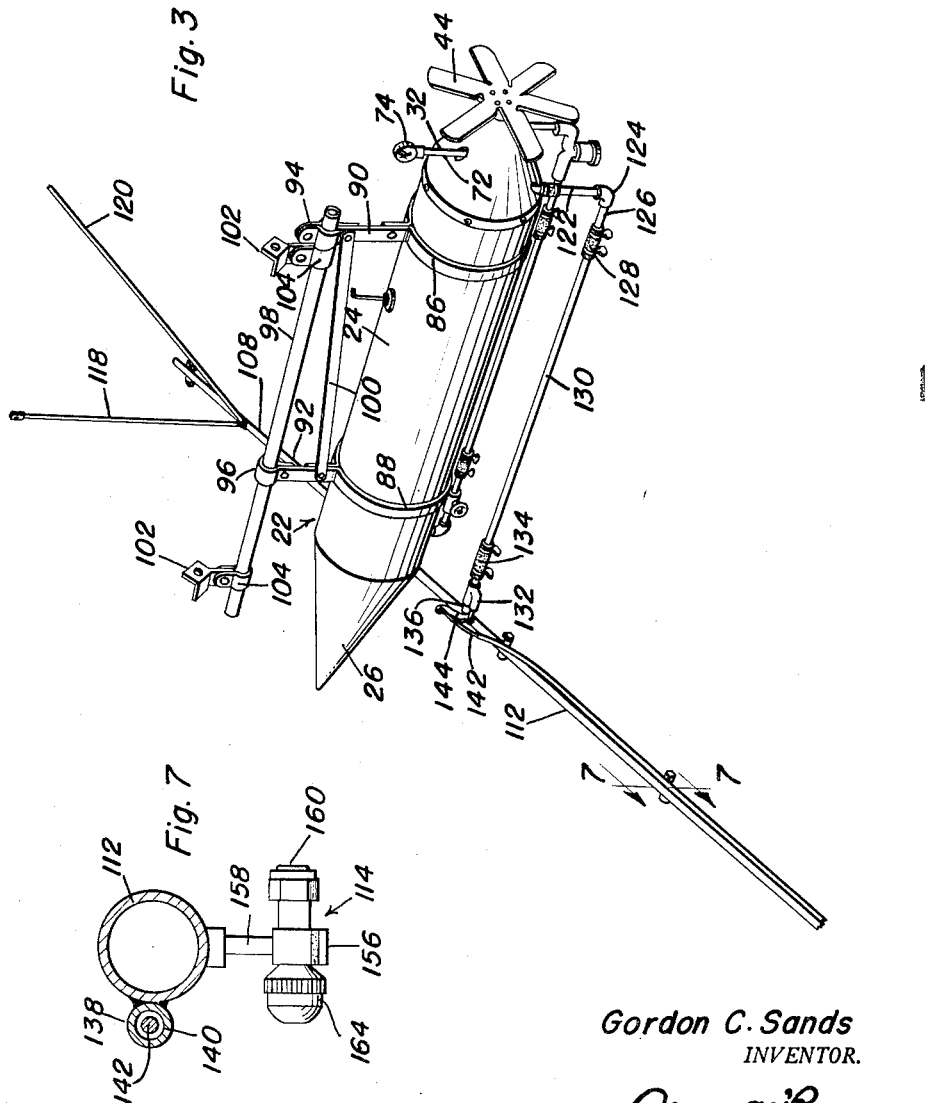
Gordon C. Sands
INVENTOR.

Patented Jan. 5, 1954

2,665,092

UNITED STATES PATENT OFFICE 2,665,092

SPRAYING ATTACHMENT FOR AIRPLANES

Gordon C. Sands, Havre, Mont.

Application June 13, 1952, Serial No. 293,313

5 Claims. (Cl. 244—136)

This invention relates in general to spraying attachments, and more particularly to spraying attachments adapted to be secured to airplanes.

The primary object of this invention is to provide an improved spraying attachment for airplanes which may be conveniently and easily connected to and removed from an airplane whereby said airplane may be utilized for both spraying purposes and for ordinary flying.

Another object of this invention is to provide an improved spraying attachment for airplanes in which storage tanks for spray fluid are mounted externally of the fuselage of an airplane and prevents the almost certain spilling and leaking of toxic chemicals into the interior of the airplane and reduces the fire hazard.

Another object of this invention is to provide an improved spraying attachment for airplanes which is mounted exteriorly of the cabin of the airplane and may be secured thereto through a minimum of special fittings.

Another object of this invention is to provide an improved spraying attachment for airplanes, said spraying attachment including a streamlined housing, said housing having the rear portion thereof in the form of an elongated fluid supply tank and the forward end thereof being formed with a streamline nose in which is mounted a pump mechanism.

Another object of this invention is to provide an improved pump mechanism for a spraying attachment for airplanes, said pump mechanism being mounted in a streamlined housing at the forward end of a fluid supply tank, said pump mechanism being driven by a fan extending forwardly from the pump mechanism and adapted to be rotated by air passing therethrough while an airplane to which the spraying attachment is attached is moving through the air.

Another object of this invention is to provide an improved piping system for a spraying attachment for airplanes, said piping system including a by-pass valve positioned adjacent the pump whose capacity is greater than that of the spray nozzles whereby fluid is circulated through the fluid supply tank in order to keep the fluid stored therein constantly agitated.

A further object of this invention is to provide an improved spraying attachment for airplanes which is adapted to be mounted under the wing of the airplane, said spraying attachment being provided with gauges which may be read from the cabin of the airplane, the cabin of the airplane being provided with control means for automatically controlling the spraying from the spraying apparatus from within the cabin.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 2 is a fragmentary plan view of the underside of the airplane of Figure 1 and shows the relationship of the airplane wing and the spraying apparatus, and the manner in which the spraying apparatus is secured to the underside of the airplane wing;

Figure 3 is an enlarged perspective view of one-half of the spraying attachment and showing the supporting means therefor whereby it may be secured to the underside of an airplane wing, the airplane wing being omitted;

Figure 5 is an enlarged fragmentary transverse vertical sectional view taken substantially upon the plane indicated by the section line 5—5 of Figure 2 and shows the control means mounted within the cabin of the airplane for controlling the spraying operation;

Figure 6 is an enlarged transverse vertical sectional view through a portion of the housing and shows the manner in which the housing is suspended from a wing strut; and Figure 7 is an enlarged transverse vertical sectional view taken substantially upon the plane indicated by the section line 7—7 of Figure 3 and shows the manner in which a spray nozzle is connected to a spray boom, also shown is the construction of a guide for a valve actuating cable.

Similar characters of reference indicate similar or identical elements and portions throughout the specification and throughout the different views of the drawings.

Figure 1:
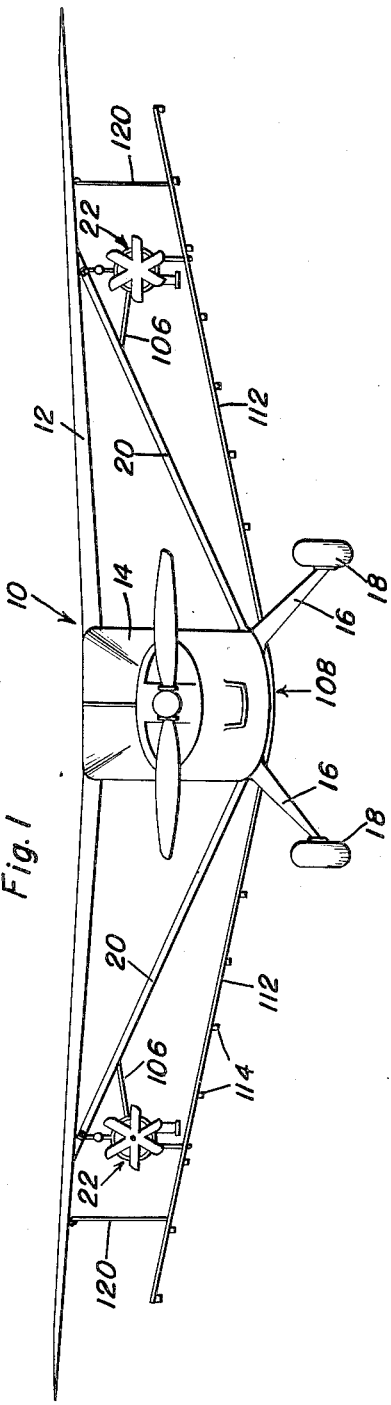
Figure 1 is a front elevational view of a conventional airplane having mounted under the wing thereof the spraying attachment which is the subject of this invention, the relative position of the various elements of the spraying attachment with respect to the airplane being clearly illustrated.

Referring now to the drawings in detail, it will be seen that there is illustrated in Figures 1 and 2 a conventional airplane, which is referred to in general by the reference numeral 10. The airplane 10 is of the mono-wing type and includes a wing 12 carried by a fuselage 14, the wing 12 extending from the upper portion of the fuselage 14 in the vicinity of the cabin thereof. The fuselage 14 is also provided with a pair of landing struts 16 which have landing wheels 18 mounted on the lower end thereof. It will be noted that the halves of the wing 12 are supported by lift struts 20 which are secured to the underside of the wing halves adjacent the outer ends thereof and extend upwardly from the bottom portion of the fuselage 14 in the vicinity of the connection between the wheel struts 16 and the fuselage.

Figure 4:
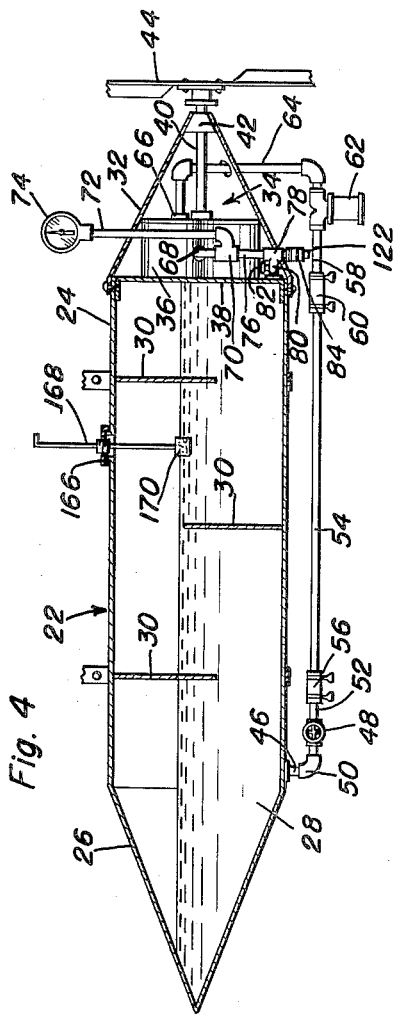
Figure 4 is an enlarged longitudinal vertical sectional view taken along the center line of one of the housings of the spraying attachment and shows the relationship of the various elements carried thereby.

Referring now to Figures 3 and 4 particularly, it will be seen that there is illustrated a streamline housing, which is referred to in general by the reference numeral 22, which forms a major portion of the spraying attachment. The major portion of the housing 22, the elongated cylindrical central portion 24 and the streamline tail 26, is in the form of an elongated tank 28 which is divided only by a plurality of baffles 30 which extend a major portion of the distance across the tank to eliminate the sloshing of fluid within the tank 28 and provide an even distribution of fluid therein. The housing 22 also includes a streamline nose 32 which is secured to the front end of the central portion 24 and has housed therein a pump mechanism, which is referred to in general by the reference numeral 34.

It will be seen that the pump mechanism 34 includes a fluid pump 36 which is secured to the forward wall 38 of the tank 28 and has extending forwardly therefrom a drive shaft 40. The drive shaft 40 extends through an opening in the forward end of the nose 32 and is supported by a bearing 42 mounted therein. The forward end of the drive shaft 40 has mounted thereon a fan 44 which is intended to be rotated by forward movement of the same through the air when the housing 22 is attached to an airplane.

Mounted at the rear end of the tank 28 adjacent the beginning of the streamline tail portion 26 is an outlet 46 which is connected to a shut-off valve 48 by an L-shaped fitting 50. Extending horizontally from the valve 48 is a short section of piping 52 which is connected in turn to an elongated section of the piping 54 by a section of hose 56. The forward end of the elongated section of the piping 54 is connected to a short length of piping 58 by a short section of hose 60, and the piping 58 is connected to a strainer 62 at its forward end. The strainer 62 is connected by piping 64, which extends upwardly inside of the nose 32, to an inlet 66 of the pump 36.

The outlet 68 of the pump 36 extends horizontally from one side of the pump and is connected to a T-shaped fitting 70. Extending outwardly from one leg of the T-shaped fitting 70 is a section of piping 72 which has mounted on the upper end thereof a pressure gauge 74 for indicating the working pressure of the pump 36. Extending downwardly from the other leg of the T-shaped fitting 70 is a section of piping 76 which is connected to a T-shaped fitting 78. Extending horizontally from the T-shaped fitting 78 is a section of piping 80 to which is connected a by-pass valve 82. The by-pass valve 82 is of the needle type valve for regulating flow and is provided with an outlet 84 connected to the interior of the tank 28 through the forward wall 38 thereof. It will be understood that the pump 36 is provided with a built-in relief valve which remains open when fluid is not being sprayed. However, fluid is pumped back into the tank 28 under all conditions and thereby provided agitation for the fluid therein. The capacity of the pump 36 is greater than that of the nozzle so that even during a spraying operation a portion of the fluid is shunted back into the tank 28.

Referring now to Figure 3 in particular, it will be seen that extending around the central portion 24 of the housing 22 adjacent the ends thereof are a pair of circular bands 86 and 88, the circular band 86 being adjacent the nose portion 32 and the circular band 88 being adjacent the tail portion 26. Extending upwardly from and integral with the circular bands 86 and 88 are vertically extending hangers 90 and 92, respectively. The upper ends of the hangers 90 and 92 are provided with clamp elements 94 and 96, respectively, which together with the upper ends of their respective hangers 90 and 92 form clamps for clamping a horizontally disposed hanger rod 98. Extending diagonally downwardly from the hanger 90 from a point adjacent the hanger rod 98 to the hanger 92 adjacent its connection with the circular band 88 is a diagonal brace 100.

Carried by the hanger rod 98 adjacent the ends thereof are identical hangers 102 which are secured to the hanger rod 98 by clamps 104. As is best illustrated in Figure 6, the hangers 102 are secured to edges of one of the V-shaped lift struts 20 supporting one half of the wing 12 of the airplane 10. The housing 22 is also braced against swinging by diagonal braces 106 which extend from the central portion 24 substantially horizontally inwardly toward the fuselage 14 and are connected to the respective V-shaped lift struts 20.

Referring now to Figure 2, it will be seen that the airplane 10 has secured to each of the V-shaped lift struts one of the housings 22 and that the housings 22 are associated with a V-shaped spray boom 108 carried by the fuselage 14 and the wing 12. It will be noted that the V-shaped spray boom 108 includes a central portion 110 which is secured to the underside of the fuselage 14, and a pair of outwardly and rearwardly extending portions 112 which communicate with the central section 110. Carried by the V-shaped spray boom 108 is a plurality of spray nozzles, which are referred to in general by the reference numeral 114. It will be noted that ends of the wing portions 112 of the spray boom 108 extends substantially to the wing tips 116 of the wing 12 and are supported by bracing carried by the underside of the wing halves. The bracing consists of a vertically extending support rod 118 which is connected to a fitting extending downwardly from the underside of the wing half, and a diagonal support rod 120 which is connected to the vertical support rod 118 at its intersection with the wing portion 112 of the spray boom 108. It will be understood that the upper end of the brace rod 120 is also connected to a fastener projecting downwardly from the underside of its respective wing half.

Referring now to Figure 3 in particular, it will be seen that extending downwardly out of the nose portion 32 of the housing 22 is a fluid supply pipe 122 which is connected to the third leg of the T-shaped fitting 78. The fluid supply pipe 122 is connected to a short length of piping 124 by an L-shaped fitting 126, the piping 124 extending horizontally and rearwardly and in spaced parallel relation to the longitudinal axis of the housing 22. Connected to the rear end of the piping 124 is a section of hose 128 which is in turn connected to the forward end of the elongated section of piping 130. The piping 130 is connected at its rear end to a shut-off valve 132 by a short length of hose 134. The outlet 136 of the shut-off valve 132 is in turn communicated with the interior of the wing portion 112 of the spray boom 108 adjacent thereto. It will be noted that all of the lengths of piping are connected together at intervals by short lengths of hose whereby vibration damage is minimized.

Secured to the wing portions 112 of the V-shaped spray boom 108 at spaced intervals are short lengths of tubing 138 which form supports for a flexible conduit 140 in which is mounted a flexible cable 142. As is best illustrated in Figure 3, one end of the flexible conduit 140 terminates adjacent the shut-off valve 132 and the associated cable 142 extends outwardly therefrom and is connected at its ends to a control arm 144 of its respective shut-off valve 132.

As is best illustrated in Figure 5, secured to the underside of an instrument panel 146 of the airplane 10 is a fitting 148 to which is pivotally connected a downwardly extending actuating lever 150. Mounted forward of the actuating lever 150 is a pulley 152 which is supported by a bracket 154. The inner ends of the flexible cables 142 extend upwardly around the pulley 152 and are connected to the actuating lever 150. It will be understood that the shut-off valves 132 may be actuated by merely moving the actuating lever 150 which moves the flexible cables 142 which in turn moves the actuating arms 144 of the shut-off valve 132.

Referring now to Figure 7 in particular, it will be seen that each of the spray nozzles 114 includes a generally tubular fitting 156 which is connected to the underside of the respective wing portion 112 of the spray boom 108 by a short length of tubing 158. Extending forwardly from the tubular fitting 156 is the nozzle portion 160. Extending from the tubular fitting 156 in the opposite direction of the nozzle 160 is a needle valve shaft which is provided at its other end with a control handle 164. It will be understood that the spray of fluid through the individual spray nozzles 114 may be controlled by adjusting the needle valve through the use of the control handle 164. The spray nozzles 114 are provided with check valves (not shown) to instantly shut off the flow of fluid upon closing of the shut-off valve 132.

It will be noted that the housings 22 are mounted adjacent the cabin of the fuselage 14 whereby they are clearly visible to the pilot of the airplane 10 seated therein. It will be understood that the pressure gauges 74 of the housing 72 are such size whereby they be easily read from within the fuselage 14.

Referring now to Figure 4 in particular, it will be seen that carried by a fitting 166 on the upper side of the tank 28 is a float rod 168 which has mounted on its lower end a float 170. The upper end of the float rod 168 is also clearly visible from the fuselage 14 whereby the amount of fluid remaining in the tank 28 may be quickly determined.

It will be understood that the primary use of the airplane 10 is intended for purposes other than spraying and it is not desired to continuously burden the airplane 10 with the spraying mechanism. The spraying mechanism, therefore, has been designed whereby it may be quickly detached and secured to the aircraft 10 in order that the airplane 10 may be conveniently converted into condition for spraying fields. It will be understood that although the spraying attachment is extremely easy to attach and to disengage from the airplane 10, it is also rigid in construction and light in weight.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. In combination with an aircraft having wing struts, an elongated housing forming a tank suspended from one of said wing struts, pump means at the forward end thereof, said pump means being enclosed in a nose portion of said housing, a spray boom associated with said housing for spraying fluids carried by said tank, said pump means being connected to said tank and said spray boom by piping, said piping including a by-pass valve, said by-pass valve being connected to said tank by a return line, said by-pass valve being positioned adjacent the outlet of said pump means whereby fluid is returned to said tank for agitating fluid stored therein.

2. In combination with an aircraft having wing struts, an elongated housing forming a tank suspended from one of said wing struts, pump means at the forward end thereof, said pump means being enclosed in a nose portion of said housing, a spray boom associated with said housing for spraying fluids carried by said tank, said pump means being connected to said tank and said spray boom by piping, said piping including a by-pass valve, said by-pass valve being connected to said tank by a return line, said by-pass valve being positioned adjacent the outlet of said pump means whose capacity is greater than that of the spray booms whereby fluid is returned to said tank for agitating fluid stored therein, a quickly shut-off valve for controlling the flow of fluid to said spray boom.

3. In combination with an aircraft having wing struts, an elongated housing forming a tank suspended from one of said wing struts, pump means at the forward end thereof, said pump means being enclosed in a nose portion of said housing, a spray boom associated with said housing for spraying fluids carried by said tank, said pump including a drive shaft extending through the forward end of said nose portion, a fan mounted on said drive shaft for driving said pump, said pump means being connected to said tank and said spray boom by piping, said piping including a by-pass valve, said by-pass valve being connected to said tank by a return line, said by-pass valve being positioned adjacent the outlet of said pump means which has a capacity greater than that of the spray booms whereby fluid is returned to said tank for agitating fluid stored therein.

4. The combination of claim 2 wherein said shut-off valve is controlled from a cabin of said aircraft, a control cable being connected between said shut-off valve and a control handle in said cabin.

5. The combination of claim 4 wherein said control cable is partially supported by said spray boom.

GORDON C. SANDS.

References Cited in the file of this patent

UNITED STATES PATENTS

| Number | Name | Date |
|---|---|---|
| 481,718 | Salisbury | Aug. 30, 1892 |
| 2,395,827 | Husman et al. | Mar. 5, 1946 |
| 2,488,554 | Otterson | Nov. 22, 1949 |
| 2,504,580 | Pierson | Apr. 18, 1950 |